United States Patent [19]

Lavarini et al.

[11] Patent Number: 5,038,357
[45] Date of Patent: Aug. 6, 1991

[54] GASEOUS FLUX LASER DEVICE

[75] Inventors: Bernard Lavarini, Jouy en Josas; Michel Mercier, Villejuif, both of France

[73] Assignee: Compagnie Generale d'Electricite S.A., Paris, France

[21] Appl. No.: 655,792

[22] Filed: Feb. 5, 1976

[30] Foreign Application Priority Data

Feb. 18, 1975 [FR] France .................. 75 05009

[51] Int. Cl.[5] .......................................... H01S 3/22
[52] U.S. Cl. ........................................ 372/58; 372/59; 372/61
[58] Field of Search .............. 331/94.5 P, 94.5 G, 331/94.5 D; 330/4.3; 239/556, 557, 265.11; 372/58, 59, 61

[56] References Cited

U.S. PATENT DOCUMENTS

| | | | |
|---|---|---|---|
| 2,832,666 | 4/1958 | Hertzberg et al. | 330/4.3 |
| 3,046,732 | 7/1962 | Foa | 239/556 |
| 3,614,656 | 10/1971 | Pinsely et al. | 331/94 J P |
| 3,760,294 | 9/1973 | Roberts et al. | 331/94.5 D |

OTHER PUBLICATIONS

Stregack et al., "$D_2$-$CO_2$ and $D_2$-$N_2O$ Electric Discharge Gas Dynamic Lasers", 12/15/75, pp. 670-671, A.P.L., vol. 27, #12.
Warren, "Chemical Lasers," 4/75, pp. 36-49, Astronautics & Aeronautics.
Russell, "Fluid Mechanics of High Power Grid Nozzle Lasers", 2/1/74, pp. 1-15, AIAA Paper No. 74-223.
Yatsiv et al., "Experiments with a Pulsed $CO_2$ Gas Dynamic Laser", 2/72, pp. 161-163, IEEE Jour. Quant. Elec., vol. QE-8, #2.

Primary Examiner—Nelson Moskowitz
Attorney, Agent, or Firm—Cushman, Darby & Cushman

[57] ABSTRACT

The invention concerns a gaseous flux laser device. To enable the removal into the atmosphere of the exhaust gases of an $N_2$-$CO_2$ laser while maintaining a sufficiently low pressure in the zone where the stimulated light emission occurs, the carbon dioxide is injected through supersonic nozzles and an exhaust tube having a sufficient length is used. Application to the generating of powerful coherent light beams.

7 Claims, 1 Drawing Sheet

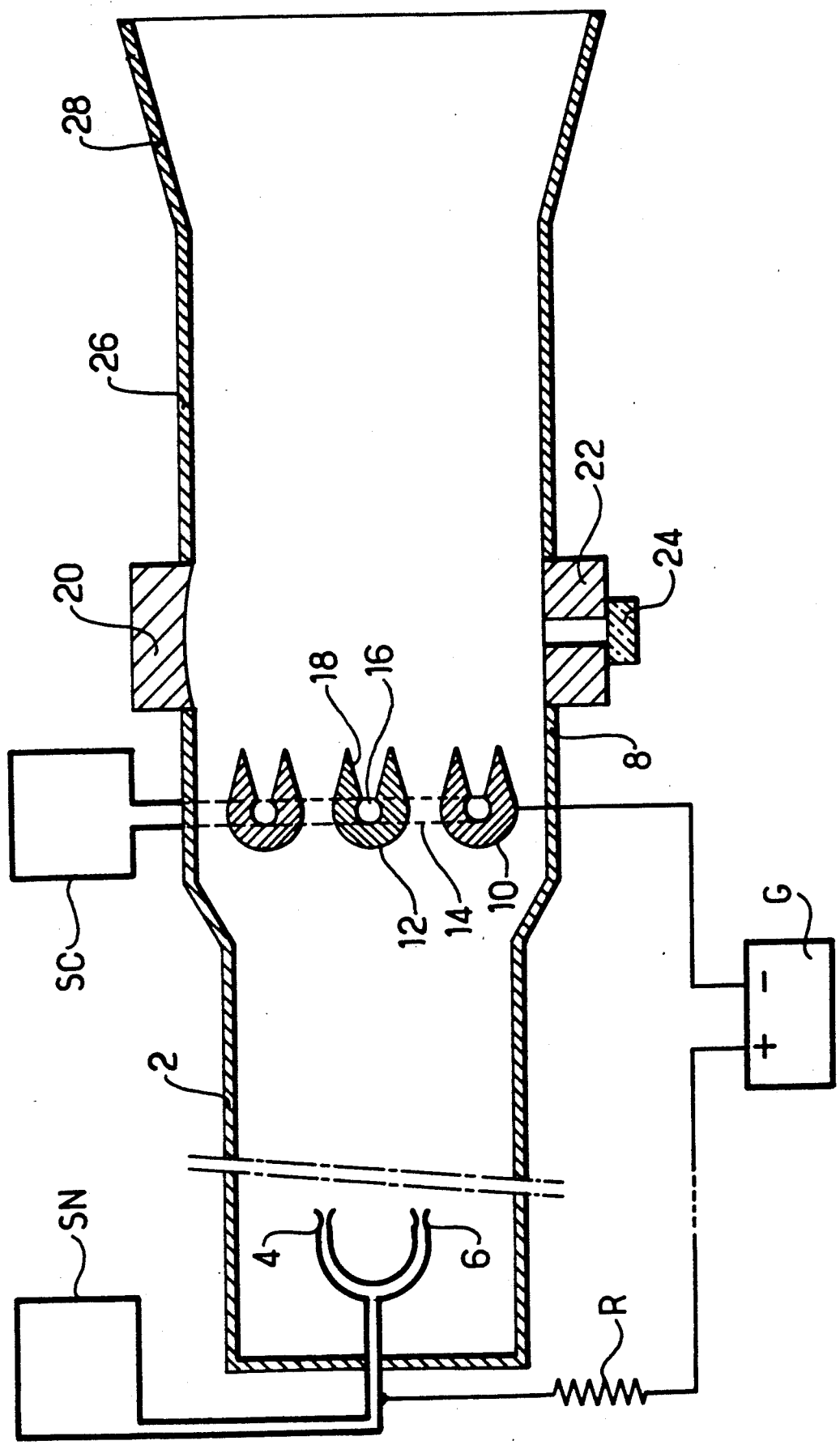

GASEOUS FLUX LASER DEVICE

The present invention concerns a gaseous flux laser device.

Laser generators in which is produced an electric discharge in a primary gas which is mixed with a secondary gas in an expansion chamber in which is arranged a resonant cavity, are known. The electric discharge has the effect of supplying to the primary gas an excitation energy which is subsequently transferred to the second gas by moleculars interraction. The excitation of that second gas enables the latter to give a stimulated light emission within an optical cavity, that is, a laser emission.

The molecules of the primary gas, for example nitrogen, have three possible mode of excitation: thermal, rotational and vibrational. The relaxation times of the first two modes are very short; hence it results therefrom that when the nitrogen molecules and the molecules of the secondary gas, for example carbon dioxide, mix in the expansion chamber, the vibrational energy of the nitrogen produces, within the carbon dioxide, the reversing of the population which gives rise to a high-power laser pulse. The secondary gas could, however, also be, for example, carbon monoxide, CO.

For the excitation of the nitrogen to take place in good conditions, the electric excitation discharge must be stable and diffused and there must, more particularly, be no generating of an electric arc. However, for the power of the laser to be great, it is an advantage for the power of the excitation discharge and the pressure of the nitrogen to be increased.

These requirements are however limited on the one hand by the danger of the generating of an electric arc, even if the flow of the nitrogen is transformed into a swirling flow, on the other hand, by the fact that an increase in pressure requires an increase in the electric voltage of the discharge. If that voltage becomes too high, the generating of interface electric discharges outside the excitation chamber must be avoided and this requires the use of very expensive electrical insulating means.

For nitrogen to mix with the carbon dioxide in the expansion chamber before having lost its vibrational excitation, a supersonic speed in the nozzles making the excitation chamber communicate with the expansion chamber must be imparted to it. For that purpose, the pressure in the expansion chamber must be less than about half the pressure in the excitation chamber.

The pressure in the expansion chamber must, on the other hand, be sufficiently low for the transfer of the excitation energy from the nitrogen to the carbon dioxide and the stimulated light emission by the latter to be able to take place in good conditions. More precisely, if the pressure in the expansion chamber is too high, in the vicinity of the atmospheric pressure, for example, the relaxation time of the carbon dioxide molecules becomes too a short, that is, these molecules lose their excitation energy too fast by collision between molecules. It results from this that the carbon dioxide molecules which are excited at the beginning of the mixing process with the nitrogen, have lost their excitation energy before the end of that process. Only a slight fraction of the excitation energy transferred to the carbon dioxide could then be used for the stimulated light emission.

Removal means are therefore necessary for maintaining the pressure in the expansion chamber at a sufficiently low level which is very much lower than the atmospheric pressure. They are conventionally constituted by an enclosure having a large cross-section which is provided with suitable pumping means and into which the expansion chamber leads. That enclosure and those pump means are expansive and bulky.

It is, moreover a known practice to bring the carbon dioxide into the expansion chamber by means of injectors fed with gas at high pressure and drilled with injection orifices through which the gas assumes a speed equal to that of sound. This arrangement enables the accurate determining of the carbon dioxide flow rate.

It is also a known practive to arrange the carbon dioxide injectors so that the gaps between two neighbouring injectors form the nozzles through which the nitrogen passes from the excitation chamber to the expansion chamber. The injection orifices for the carbon dioxide are drilled in the "downstream" face of those injectors so as to direct the stream towards the expansion chamber, parallel to the nitrogen flow. The arrangement enables a proper mixing of the two gases.

The aim of the present invention is to produce a gaseous flux laser device in which the means for removal from the expansion chamber are simple and not very expansive.

It has as its object a gaseous flux laser comprising:

An elongated excitation chamber opening out, at its downstream end, into an expansion chamber;

At least one primary injector for bringing in a primary gas at the upstream end of that excitation chamber, setting up, in that chamber, a swirling flow;

At least two electrodes for setting up, in that excitation chamber, an electrical "excitation" discharge which is stable and diffused for exciting that primary gas;

Several secondary injectors which are arranged at the downstream end of the excitation chamber to form a barrier separating it from the expansion chamber, the gaps between two secondary injectors forming primary nozzles through which the primary gas can pass from the excitation chamber to the expansion chamber, each of these primary nozzles having a constriction with a minimum cross-section and a part diverging from that constriction and leading into expansion chamber, this enabling the primary gas to acquire, in that diverging part, a supersonic speed when there is a sufficient pressure ratio between the excitation chamber and the expansion chamber, each of the secondary injectors having at least one injection orifice opening out into the expansion chamber so as to bring a secondary gas into the flow of primary gas, certain molecules of that secondary gas being suitable for being excited by transfer of energy from the excited molecules of the primary gas and form emitting, then, light;

Optical means for enabling stimulating emission of coherent light by the secondary gas in an emission zone of the expansion chamber;

The discharge rate of the primary injector and the total cross-section of the constrictions of the assembly formed by the primary nozzles being chosen so that the pressure of the primary gas in the excitation chamber be comprised between 0.3 and 3 atmospheres, this making that pressure compatible with an electric discharge which is simultaneously powerful, stable and diffused in that gas and with proper operation of the primary nozzles without requiring excessive electrical insulating devices outside the excitation chamber;

The feed pressure of the secondary injectors being chosen so as to be sufficient for the second gas to reach a sonic speed in the injection orifices;

Removal means being provided for maintaining the pressure in the expansion chamber at a level lower that 0.4 atmospheres, this ensuring, on the one hand, a speed of the primary gas which is at least sonic at the output of the primary nozzles and allows it to mix with the secondary gas to impart to it its excitation energy before that energy is lost and preventing, on the other hand, because of the increase in the relaxation time of the secondary gas when the pressure decreases, the molecules of the secondary gas, excited at the beginning of the mixing and excitation energy transfer process, from losing their excitation energy before the end of that process and upstream from the said emission sone; Characterized in that the said removal means comprise:

An exhaust tube continuing the expansion chamber and opening out into the atmosphere, that tube having a length which is sufficient to allow the said mixed gases to slow down to a subsonic speed before the output of that tube, increasing their pressure until at least atmospheric pressure;

And secondary diverging nozzles arranged at the output of the said injection orifices of the secondary injectors, so that the secondary gas acquires, in those secondary nozzles, a supersonic speed on expansing until it reaches a pressure lower than that which must be maintained in steady state in the expansion chamber.

By means of the single accompanying diagrammatic figure, an embodiment of the invention having no limiting character will be described hereinbelow.

The single figure shows a cutaway view of a device according to the invention.

The device shown comprises an excitation chamber 2, having the shape of a cylinder of revolution, with a diameter of 5 cm and a length of 30 cm. At an upstream end of that chamber are arranged two primary injectors 4 and 6 connected to a supply of nitrogen under pressure, SN. Those two injectors are metallic and both end in a nozzle enabling the forming of a supersonic stream of nitrogen.

The excitation chamber 2 is connected, at its downstream end, to an expansion chamber 8 which is prismatic and has rectangular cross-section and a height of 3 cm perpendicularly to the plane of the figure and a width of 9 cm in the plane of the figure.

The upstream end of the expansion chamber 8 is partly stopped up by 15 metallic bars such as 10 and 12, which are parallel and equidistant and arranged perpendicularly to the plane of the figure along the whole height of that chamber. The gaps between those bars form primary nozzles such as 14, which are firstly convergent up to a constriction, then divergent from that constriction and through which the nitrogen can pass from the chamber 2 to the chamber 8. The width of those nozzles 14 at the constriction is 0.85 mm. The width at the constriction is divided by two for the two lateral nozzles situated between a lateral wall of the chamber 8 and a bar such as 10 next to that wall. The tatal lenght of those nozzles, that is, the length of those bars such as 10, parallel to the flow of the nitrogen, is 13.5 mm. The length of the converging part of those nozzles must be less than about 15 mm, for example 10 mm, to avoid a de-excitation of the nitrogen on the walls. The width of the bars at the constriction of the nozzle is 5.15 mm, giving a pitch of 6 mm.

On condition that the pressure in the enclosure 8 be sufficiently low, the nitrogen assumes a sonic speed at the constriction of the primary nozzles such as 14 and a supersonic speed in the devergent part of those nozzles. The discharge rate of the primary injectors 4 and 6 is chosen so that the pressure in the enclosure 2 be about 1 atmosphere. The high speed of the nitrogen stream which they provide, as well as the choice of the dimensions of the excitation chamber 2 and of the primary nozzles such as 14 cause a swirling flow of the nitrogen to be produced in that chamber. That flow makes it possible to make stable an electric excitation discharge set up between on the one hand, the primary injectors 4 and 6 connected to the positive terminal of an electric generator 6 across a stabilizing resistor R and, on the other hand, the bars such as 10 and 12. The energy of that discharge is comprisesd, preferably, between 500 and 5000 kilojoules par kilogram of nitrogen injected, for example 1,500 kj/kg.

The bars such as 10 and 12 constitute secondary injectors enabling the injecting, into the expansion chamber, of a secondary gas constituted by a mixture of carbon dioxide and helium, or of carbon dioxide and water vapour. Those secondary injectors are arranged so that a movement parallel to that of the nitrogen be imparted to the secondary gas and that the secondary gas mixes with the latter as soon as it leaves the output of the primary nozzles. For that purpose, the secondary injectors are fed in parallel under pressure from a tank SC and are each provided with a rectangular injection orifice such as 16, extending over the whole height of the injector and through which the secondary gas reaches a sonic speed. According to the invention and with a view to increasing the speed and lowering the pressure of the secondary gas, those injection orifices are followed by diverging secondary nozzles such as 18, having a length of 5 mm, pointing parallel to the primary nozzles such as 14. This enables the lowering of the pressure in the enclosure 8 to a suitable level.

The downstream face of the secondary injectors such as 12 is completely hollowed out to form the output of the secondary nozzles such as 18, whose two lateral walls are therefore connected to the downstream ends of two lateral walls of two primary nozzles along two lines forming a ridge at an acute angle. These two lines are perpendicular to the plane of the figure. This arrangement makes it possible to ensure a fast mixing of the secondary gas with the nitrogen.

It seems that the area of the output cross-section of the primary nozzles such as 14 must be comprised, preferably between 1.1 and 5 times, for example, equal to twice the area the cross-section of those nozzles at their constriction. In the case where the secondary gas contains helium, it seems that the area of the output cross-section of the secondary nozzle such as 18 must preferably be comprized between 1.5 and 5 times, for example equal to 3.5 times the area of the cross-section of those nozzles at their constriction. It seems that the total area of the outputs of those secondary nozzles must preferably be comprised between 60% and 90%, for example 75% of the area of the cross-section of the expansion chamber 8.

The mixture of the three gases can comprise the following proportions, given respectively by way of an example and showing the lower and upper apparent limits:

|  | Average | Minimum | Maximum |
|---|---|---|---|
| $CO_2$ | 12% | 5% | 20% |
| He | 65% | 60% | 70% |
| $N_2$ | 23% | 35% | 10% |
| or |  |  |  |
| $CO_2$ | 75% | 70% | 80% |
| $H_2O$ | 2% | 1% | 5% |
| $N_2$ | 23% | 29% | 15% |

Immediately dowstream from the secondary injectors such as 10 and 12, the two lateral walls of the expansion chamber 8 perpendicular to the plane of the figure are replaced by two metallic mirrors 20 and 22, having a rectangular shape, with a height of 3 cm, perpendicularly to the plane of the sheet and a length of 8 cm parallel to the gaseous flow. The mirror 20 is concave and full. The mirror 22 is plane and drilled with a central opening of 12 mm in diameter, stopped up by a window 24 made of sodium chloride. Thus, an optical resonant cavity enabling the generating of a stimulated light emission from the excitation energy supplied by the nitrogen to the carbon dioxide is formed, the light thus produced being able to emerge through the window 24. The space inside that cavity has previously been called the emission zone. The position of that zone remains the same if the mirrors 20 and 22 are replaced by windows to use the device described as a laser amplifier.

The expansion chamber 8, whose downstream end can coincide with that of the mirrors 10 and 22, is continued by an exhaust tube 26 which is also prismatic and has the same cross-section, with a length of 48 cm, and leads out into the atmosphere by a slightly divergent part 28 having a length of 12 cm.

That divergent part has two walls parallel to the plane of the figure, forming a continuous part with the corresponding walls of the first part of the tube and two walls perpendicular to the plane of the figure forming an angle of 6° with the extension of the corresponding walls of the first part of the tube.

It seems preferable for the total length of the exhaust tube 26 (60 cm in the example described) to be at least equal to 25 times its "hydraulic diameter", that is, the ratio between the area of the cross-section of that tube (27 squ. cm in the example described) and the perimeter of that cross-section (24 cm). This allows the gases flowing at supersonic speed at a pressure of less than 0.3 atmospheres in the expansion chamber 8, to slow down to a subsonic speed, inside the tube 26, this being accompanied by an increase of the pressure up to one atmosphere.

We claim:

1. Gaseous flux laser comprising:
   an elongated excitation chamber opening outwardly at its downstream end into an expansion chamber;
   at least one primary injector at the upstream end of the excitation chamber and means for feeding a primary gas under pressure to said at least one primary injector for injecting a primary gas and setting up, in said excitation chamber, a swirling flow;
   at least two electrodes for setting up, in the excitation chamber, a stable and diffused electrical "excitation" discharge for exciting the primary gas;
   several laterally aligned and spaced secondary injectors arranged at the downstream end of said excitation chamber to form a barrier separating it from the expansion chamber, gaps between said secondary injectors, said secondary injectors forming primary nozzles through which the primary gas passes from the excitation chamber to the expansion chamber, each of said primary nozzles having a constriction with a minimum passage cross-section and a part diverging from that constriction and leading into the expansion chamber to enable the primary gas to acquire, in said diverging part, a supersonic speed when there is a sufficient pressure ratio between the excitation chamber and the expansion chamber, each of the secondary injectors having at least one injection orifice opening outwardly into the expansion chamber and means for feeding a secondary gas under pressure to said at least one injecting orifice to inject a secondary gas into the flow of primary gas, such that certain molecules of said secondary gas is excited by transfer of energy from the excited molecules of the primary gas and for emitting light;
   optical means for enabling the stimulated emission of coherent light by the secondary gas in an emission zone of the expansion chamber;
   the discharge rate of the primary injector and the total cross-section of the constrictions of the assembly formed by the primary nozzles being such that the pressure of the primary gas in the excitation chamber comprises between 0.3 and 3 atmospheres, to insure that the pressure is compatible with the electric discharge without requiring excessive electrical insulating devices outside the excitation chamber;
   the feed pressure of the secondary injectors being such that the secondary gas reaches a sonic speed in the injection orifices; and
   removal means for maintaining the pressure in the expansion chamber at a level lower than 0.4 atmospheres, to ensure on the one hand, that the speed of the primary gas is at least sonic at the output of the primary nozzles and to allow it to mix with the secondary gas to impart its excitation energy to it before that energy is lost and to prevent, on the other hand, because of the increase in the relaxation time of the secondary gas when the pressure decreases, the molecules of the secondary gas, excited at the beginning of the mixing and excitation energy transfer process, from losing their excitation energy before the end of that process and upstream from the said emission zone; the improvement wherein said removal means comprises:
   an exhaust tube continuing the expansion chamber and opening into the atomosphere, said tube having a length which is sufficient to allow the said mixed gasses to slow to a subsonic speed before the output of that tube increases their pressure to at least atmospheric pressure;
   and secondary diverging nozzles arranged at the output of the said injection orifices of the secondary injectors, so that the secondary gas acquires, in those secondary nozzles, a supersonic speed on expanding until it reaches a pressure lower than that which must be maintained in steady state in the expansion chamber.

2. Device according to claim 1, characterized in that the said primary gas is nitrogen and said secondary gas is carbon dioxide such that the molecules of the said secondary gas which are excited by the excited molecules of the primary gas are molecules of carbon dioxide.

3. Device according to claim 2, characterized in that the said secondary gas contains, moreover, helium, the means for feeding secondary gas comprises means for causing the flow rate of carbon dioxide to comprise between 5% and 20% of that of the mixture of the said three gases and the discharge rate of helium to comprise between 70% and 60% of that of the mixture of the three gases, the length of the converging part of the primary nozzles being less than 15 mm and the area of the output cross-section of the primary nozzles being comprised between 1.1 and 5 times the area of the cross-section of those nozzles at their constriction, the area of the output cross-section of the secondary nozzles being comprised between 1.5 and 5 times the area of the cross-section of those nozzles at their constriction, the total output cross-section of the secondary nozzles being comprised between 60% and 90% of the cross-section of the expansion chamber, the area of the cross-section to the said exhaust tube being substantially equal to that of the expansion chamber, the length of the assembly formed by that expansion chamber and that exhaust tube being greater than or equal to 25 times the ratio between the area of that cross-section and the perimeter of that cross-section, so as to enable the said mixed gases to slow down to a subsonic speed before the output of that tube and to effect a rise to a pressure greater than or equal the atmospheric pressure.

4. Device according to claim 2, characterized in that the said secondary gas contains, moreover, water vapour, and said secondary gas feeding means comprises means for causing the flow rate of carbon dioxide to comprise between 70% and 80% of that of the mixture of the said three gases and the flow rate of the water vapour to comprise between 1% and 5% of that of the mixture of the three gases, the length of the convergent part of the primary nozzles being less than 15 mm and the area of the output cross-section of the primary nozzles being comprised between 1.1 and 5 times the area of the cross-section of those nozzles at their constriction, the total output cross-section of the secondary nozzles being comprises between 60% and 90% of the cross-section of the expansion chamber, the area of the cross-section of the said exhaust tube being substantially equal to that of the expansion chamber, the length of the assembly formed by that expansion chamber and that of that exhaust tube being greater than or equal to 25 times the ratio between the area of that cross-section and the perimeter of that cross-section, so as to enable the said mixed gases to slow to a subsonic speed before the output of that tube and to effect a rise to a pressure greater than or equal to the atmospheric pressure.

5. Device according to claim 3, characterized in that the said exhaust tube is divergent at its downstream end.

6. Device according to claim 1, characterized in that the said secondary injectors have the form of bars which are substantially parallel to one another, the two lateral faces adjacent to two neighbouring bars form the two walls of a same primary nozzle, the downstream face of each those bars being substantially completely hollowed out to form the output orifice of a secondary nozzle, so that the two lateral walls of that secondary nozzle are connected at their downstream ends to the downstream ends of two lateral walls of two primary nozzles along two lines forming ridge having an acute angle, those two lines forming a ridge being arranged along the length of that bar.

7. Device according to claim 3, characterized in that the electrodes are two in number for setting up the said excitation discharge and are constituted, the one by the primary injector, the other by the upstream faces of the secondary injectors, the excitation chamber being in the shape of a cylinder of revolution, the length of that excitation chamber being comprised between 5 and 7 times its diameter, and the energy of the excitation discharge being comprised bewteen 500 and 5000 kj/kg of nitrogen injected.

* * * * *